United States Patent
Hoang

(10) Patent No.: US 12,500,489 B2
(45) Date of Patent: Dec. 16, 2025

(54) MOTOR DRIVE DEVICE AND IMAGE FORMING APPARATUS

(71) Applicant: KYOCERA Document Solutions Inc., Osaka (JP)

(72) Inventor: Tuan Manh Hoang, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 195 days.

(21) Appl. No.: 18/587,830

(22) Filed: Feb. 26, 2024

(65) Prior Publication Data
US 2024/0297557 A1 Sep. 5, 2024

(30) Foreign Application Priority Data
Mar. 2, 2023 (JP) ................... 2023-031796

(51) Int. Cl.
*H02K 11/33* (2016.01)
*B41J 13/03* (2006.01)
*H02K 23/66* (2006.01)

(52) U.S. Cl.
CPC .............. *H02K 11/33* (2016.01); *B41J 13/03* (2013.01); *H02K 2211/03* (2013.01)

(58) Field of Classification Search
CPC ..... H02K 11/33; H02K 2211/03; H02K 23/66

USPC .................................................. 310/48, 68 B
See application file for complete search history.

(56) References Cited

U.S. PATENT DOCUMENTS

2014/0103910 A1\* 4/2014 Morimoto .......... G03G 15/0853
324/204

FOREIGN PATENT DOCUMENTS

| CN | 1114111 C | \* | 7/2003 | ............. G01R 33/04 |
|---|---|---|---|---|
| EP | 2385619 A2 | | 11/2011 | |
| EP | 2717064 A1 | \* | 4/2014 | ............. G01R 33/04 |
| JP | 2001165910 A | \* | 6/2001 | |
| JP | 2011239515 A | | 11/2011 | |
| JP | 2021129358 A | \* | 9/2021 | |

\* cited by examiner

*Primary Examiner* — Jose A Gonzalez Quinones
(74) *Attorney, Agent, or Firm* — Alleman Hall & Tuttle LLP

(57) ABSTRACT

A motor drive device includes a substrate, a motor drive portion, a feed pattern, a coil pattern, and a detection circuit. The feed pattern is formed on a first surface of the substrate. The coil pattern is formed on a second surface of the substrate and includes an overlapping portion formed in a region overlapping with the feed pattern and an adjacent portion formed in a region adjacent to the feed pattern. The detection circuit detects a magnitude of an induction current that flows in the coil pattern and outputs a detection signal. The detection circuit includes a current-voltage conversion circuit and an amplifier circuit.

4 Claims, 4 Drawing Sheets

MOTOR DRIVE DEVICE AND IMAGE FORMING APPARATUS

INCORPORATION BY REFERENCE

This application is based upon and claims the benefit of priority from the corresponding Japanese Patent Application No. 2023-031796 filed on Mar. 2, 2023, the entire contents of which are incorporated herein by reference.

BACKGROUND

The present disclosure relates to a motor drive device capable of controlling a stepping motor in accordance with an effective value of a motor current, and an image forming apparatus.

In an image forming apparatus, a stepping motor is used as a drive source of a device which conveys a sheet. The image forming apparatus is, for example, a printer, a copying machine, a multifunction peripheral, or the like.

Generally, the stepping motor is driven by chopper control. It is known that the effective value of the motor current that flows in the stepping motor is detected by a current detection IC.

SUMMARY

A motor drive device according to an aspect of the present disclosure includes a substrate, a motor drive portion, a feed pattern, a coil pattern, a detection circuit, and a control portion. The motor drive portion supplies a motor current to be supplied to a stepping motor to the substrate. The feed pattern is a wiring pattern that is formed on a first surface of the substrate and through which the motor current flows. The coil pattern is a wiring pattern that is formed in a spiral in a region along the feed pattern when seen along a thickness direction of the substrate on a second surface of the substrate, and includes an overlapping portion formed in a region overlapping with the feed pattern and an adjacent portion formed in a region adjacent to the feed pattern. The detection circuit detects a magnitude of an induction current that flows in the coil pattern and outputs a detection signal. The control portion controls the motor drive portion according to the detection signal. The detection circuit includes a current-voltage conversion circuit and an amplifier circuit. The current-voltage conversion circuit converts the induction current that flows in the coil pattern into a primary detection voltage. The amplifier circuit amplifies the primary detection voltage and outputs a secondary detection voltage obtained by the amplification as the detection signal.

An image forming apparatus according to another aspect of the present disclosure includes a conveying device and a printing device. The conveying device conveys a sheet. The printing device forms an image on the sheet conveyed by the conveying device. The conveying device includes a conveying roller, a stepping motor, and the motor drive device. The stepping motor causes the conveying roller to rotate. The motor drive device supplies a current to the stepping motor.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

[Configuration of Image Forming Apparatus 10]

Figure 1:
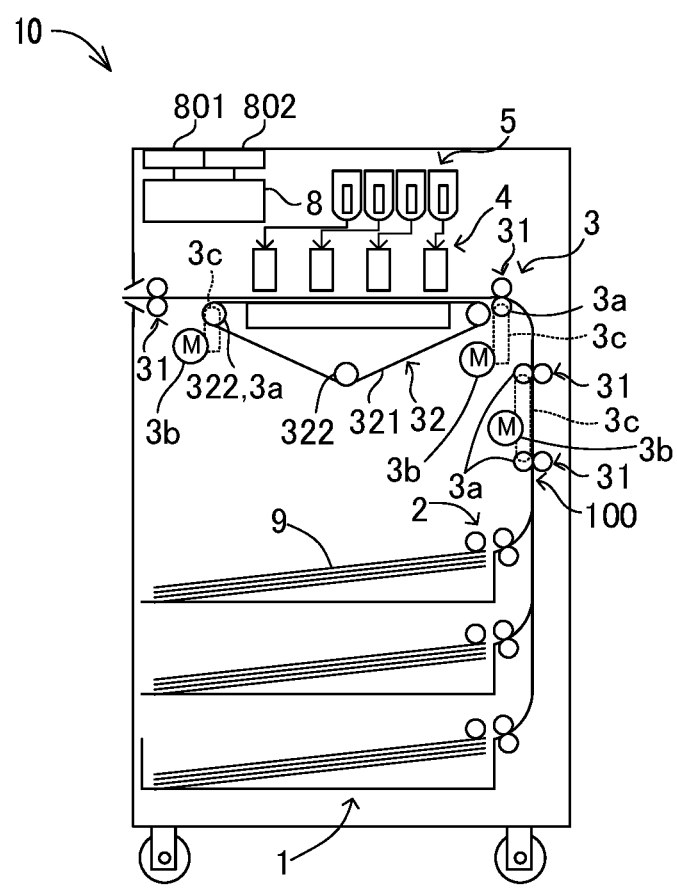
FIG. 1 is a configuration diagram of an image forming apparatus according to an embodiment.

An image forming apparatus 10 according to the embodiment includes a sheet storing portion 1, a sheet feed device 2, a conveying device 3, and a printing device 4 (see FIG. 1).

The sheet feed device 2 feeds a sheet 9 stored in the sheet storing portion 1 to a conveying path 100. The sheet 9 is an image forming medium such as paper and a resin sheet. The conveying path 100 is a path of the sheet 9.

The conveying device 3 conveys the sheet 9 along the conveying path 100. The printing device 4 forms an image on the sheet 9 conveyed by the conveying device 3.

In the example shown in FIG. 1, the printing device 4 forms an image on the sheet 9 using an inkjet system. It is noted that the printing device 4 may form an image on the sheet 9 using other methods such as electrophotography.

The conveying device 3 includes a plurality of sets of conveying roller pairs 31, a belt conveying device 32, and a plurality of stepping motors 3b. The plurality of stepping motors 3b are drive sources of the plurality of sets of conveying roller pairs 31 and the belt conveying device 32.

One of the rollers of each of the conveying roller pairs 31 is a drive roller 3a that is driven by one of the stepping motors 3b. The belt conveying device 32 includes a conveying belt 321 and a plurality of support rollers 322 which support the conveying belt 321.

One of the plurality of support rollers 322 is also the drive roller 3a that is driven by one of the stepping motors 3b. Rotational forces of the stepping motors 3b are transmitted to the drive rollers 3a by gear mechanisms 3c. In other words, the stepping motors 3b cause the drive rollers 3a to rotate. The drive roller 3a is an example of a conveying roller.

The image forming apparatus 10 further includes an operation device 801, a display device 802, and a control device 8 (see FIG. 1).

The operation device 801 is a device that accepts operations from a person and includes, for example, operation buttons and a touch panel. The display device 802 is a device that displays information and includes, for example, a panel display device such as a liquid crystal display unit.

Figure 2:
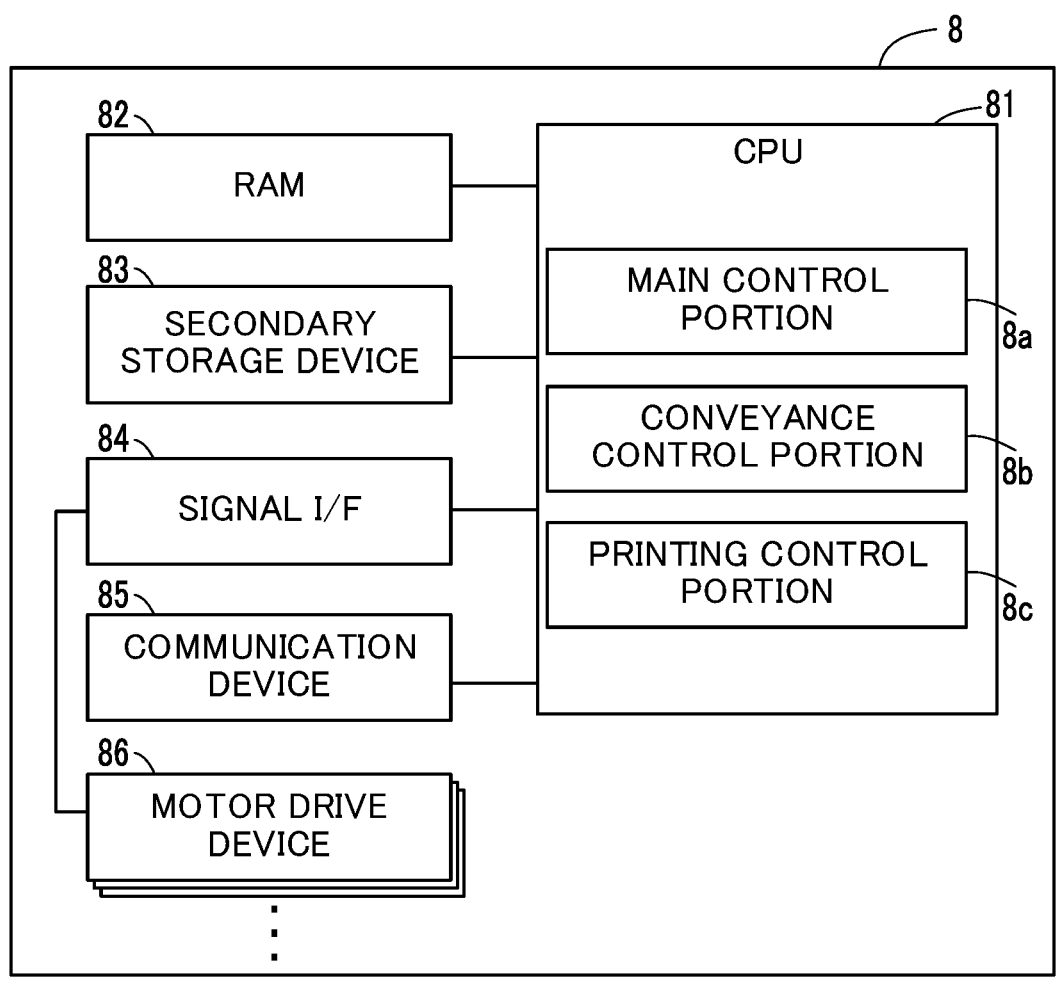
FIG. 2 is a block diagram showing a configuration of a control device in the image forming apparatus according to the embodiment.

The control device 8 executes various types of data processing. In addition, the control device 8 controls the sheet feed device 2, the conveying device 3, and the printing device 4. As shown in FIG. 2, the control device 8 includes a CPU (Central Processing Unit) 81 and peripheral equipment such as a RAM (Random Access Memory) 82, a secondary storage device 83, and a signal interface 84.

In addition, the control device 8 also includes a communication device 85, one or more motor drive devices 86, and the like. The communication device 85 is capable of communicating with other devices. For example, the communication device 85 receives printing jobs from other devices.

The motor drive device 86 supplies a current to the stepping motor 3b. For example, the control device 8 includes the plurality of motor drive devices 86 corresponding to the plurality of stepping motors 3b. The motor drive device 86 drives the stepping motor 3b by chopper control.

The CPU 81 is a processor which executes computer programs to thus execute various types of data processing and control. The RAM 82 is a volatile computer-readable storage device. The RAM 82 temporarily stores the computer programs executed by the CPU 81 and data to be output and referenced by the CPU 81 during a process of executing various types of processing.

The secondary storage device 83 is a nonvolatile computer-readable storage device. The secondary storage device 83 is capable of storing and updating the computer programs and various types of data. For example, one or both of a flash memory and a hard disk drive is/are adopted as the secondary storage device 83.

The signal interface 84 converts signals output from various sensors into digital data and transmits the digital data obtained by the conversion to the CPU 81. Further, the signal interface 84 converts control instructions output by the CPU 81 into control signals and transmits the control signals to the equipment to be controlled.

The CPU 81 includes a plurality of processing modules that are realized by executing the computer programs. The plurality of processing modules include a main control portion 8a, a conveyance control portion 8b, a printing control portion 8c, and the like.

The main control portion 8a executes control to start various types of processing in accordance with operations made to the operation device 801, control of the display device 802, and the like. The conveyance control portion 8b controls the sheet feed device 2 and the conveying device 3 to control conveyance of the sheet 9.

The printing control portion 8c controls the printing device 4 to cause the printing device 4 to execute printing processing. The printing processing is processing of forming an image on the sheet 9. For example, the printing control portion 8c causes the printing device 4 to execute the printing processing according to the printing job received by the communication device 85.

Incidentally, when an effective value of a motor current that flows in the stepping motor 3b varies in an audible band, there is a fear that the stepping motor 3b or a peripheral portion of the stepping motor 3b will emit noises.

Further, when the effective value of the motor current is excessive, there is a fear that the stepping motor 3b or a portion related to the stepping motor 3b will abnormally radiate heat.

Therefore, the motor drive device 86 needs to detect the effective value of the motor current and appropriately carry out feed control with respect to the stepping motor 3b in accordance with the detection result.

On the other hand, a current sensor IC may be adopted for detecting the effective value of the motor current. However, the current sensor IC is expensive in general.

Therefore, it is desirable to realize a circuit that detects the effective value of the motor current with a simple configuration in the motor drive device 86.

In the present embodiment, the motor drive device 86 has a configuration with which the effective value of the motor current that flows in the stepping motor 3b can be detected with a simple configuration. Hereinafter, that configuration will be described.

Figure 3:
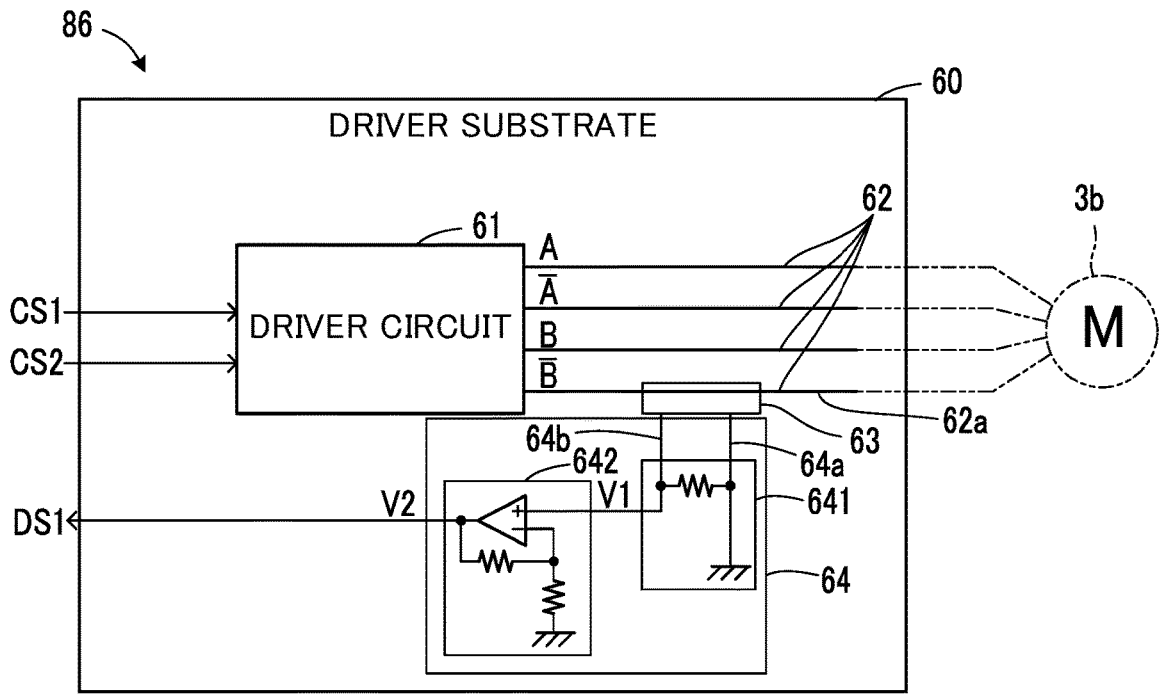
FIG. 3 is a configuration diagram of a motor drive device in the image forming apparatus according to the embodiment.

As shown in FIG. 3, the motor drive device 86 includes a driver substrate 60, a driver circuit 61, four feed patterns 62, a coil pattern 63, and a detection circuit 64.

The driver substrate 60 is a printed substrate including a circuit related to drive of the stepping motor 3b. The driver circuit 61 supplies the motor current to be supplied to the stepping motor 3b to the driver substrate 60.

The driver circuit 61 supplies the motor current to an A-phase coil and a B-phase coil of the stepping motor 3b by chopper control. The driver circuit 61 includes two bridge circuits that respectively supply the motor currents to the A-phase coil and the B-phase coil.

Further, the driver circuit 61 also includes a current control circuit, a frequency control circuit, and the like. The current control circuit controls a magnitude of the motor current. The frequency control circuit controls a frequency for switching a flow direction of the motor current.

The conveyance control portion 8b outputs a current command signal CS1 to the current control circuit (see FIG. 3). The current control circuit controls the magnitude of the motor current according to the current command signal CS1.

In addition, the conveyance control portion 8b outputs a frequency command signal CS2 to the frequency control circuit (see FIG. 3). The frequency control circuit controls the frequency for switching the flow direction of the motor current according to the frequency command signal CS2.

In the present embodiment, the driver circuit 61 is arranged on the driver substrate 60. The driver circuit 61 is an example of a motor drive portion.

The four feed patterns 62 are wiring patterns through which the motor current to be supplied to the stepping motor 3b flows. The four feed patterns 62 include A-phase feed patterns and B-phase feed patterns.

The pair of A-phase feed patterns are wiring patterns through which currents to be supplied to the A-phase coil of the stepping motor 3b flows. The pair of B-phase feed patterns are wiring patterns through which currents to be supplied to the B-phase coil of the stepping motor 3b flows.

In descriptions below, one of the four feed patterns 62 will be referred to as a target feed pattern 62a. The target feed pattern 62a is a wiring pattern to be a target for detecting the effective value of the motor current. In the example shown in FIG. 3, the target feed pattern 62a is one of the pair of B-phase feed patterns.

The coil pattern 63 is a wiring pattern formed in a spiral on the driver substrate 60. In the coil pattern 63, an induction current corresponding to the motor current that flows in the target feed pattern 62a is generated.

The detection circuit 64 detects a magnitude of the induction current that flows in the coil pattern 63 and outputs a detection signal DS1. In the present embodiment, the detection circuit 64 is arranged on the driver substrate 60.

The detection circuit 64 includes a current-voltage conversion circuit 641 and an amplifier circuit 642. The current-voltage conversion circuit 641 converts the induction current that flows in the coil pattern 63 into a primary detection voltage V1. The amplifier circuit 642 amplifies the primary detection voltage V1 and outputs a secondary detection voltage V2 obtained by the amplification as the detection signal DS1.

The detection signal DS1 is transmitted to the conveyance control portion 8b via the signal interface 84. A voltage level of the detection signal DS1 expresses a magnitude of the effective value of the motor current.

Figure 4:
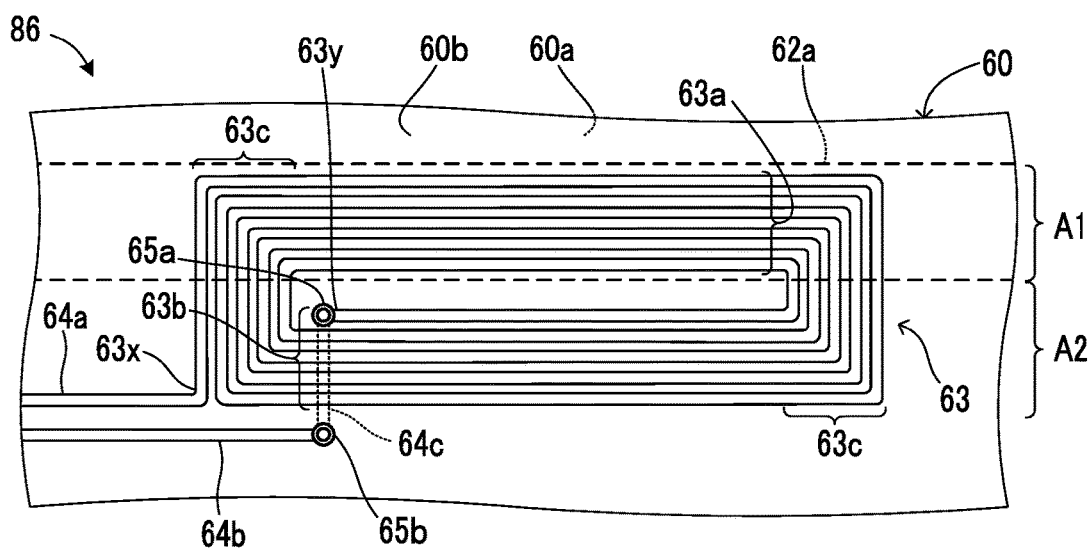
FIG. 4 is a plan view of a main portion of a motor substrate in the motor drive device of the image forming apparatus according to the embodiment.
Figure 5:
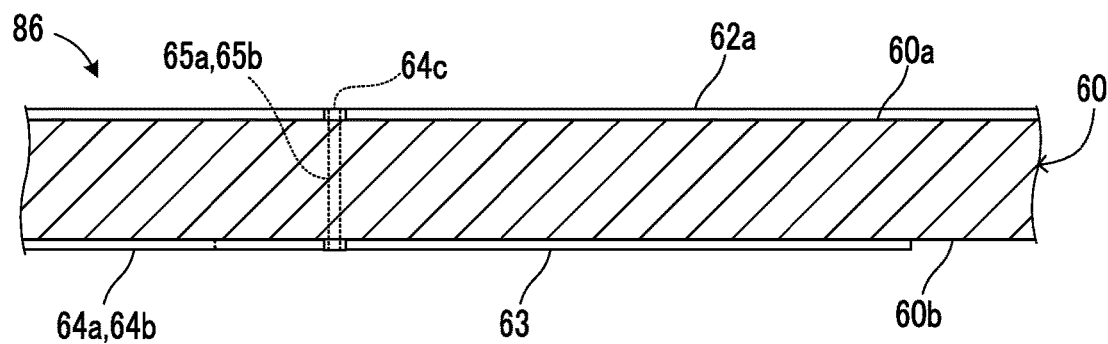
FIG. 5 is a cross-sectional view of the main portion of the motor substrate in the motor drive device of the image forming apparatus according to the embodiment.

As shown in FIG. 4 and FIG. 5, the four feed patterns 62 including the target feed pattern 62a are formed on a first surface 60a of the driver substrate 60. On the other hand, the coil pattern 63 is formed on a second surface 60b of the driver substrate 60.

In the present embodiment, the driver circuit 61 is arranged on the first surface 60a of the driver substrate 60. On the other hand, the detection circuit 64 is arranged on the second surface 60b of the driver substrate 60.

FIG. 4 is a plan view of a portion of the driver substrate 60 where the coil pattern 63 is formed, seen from the second surface 60b side. Hereinafter, a direction perpendicular to the first surface 60a and second surface 60b of the driver substrate 60 will be referred to as a thickness direction.

In FIG. 4, a first region A1 is a region overlapping with the target feed pattern 62a when seen along the thickness direction on the second surface 60b of the driver substrate 60. A second region A2 is a region adjacent to the target feed pattern 62a when seen along the thickness direction on the second surface 60b of the driver substrate 60. The second region A2 is a region not overlapping with the target feed pattern 62a when seen along the thickness direction.

The coil pattern 63 is formed in a spiral in a region along the target feed pattern 62a when seen along the thickness direction on the second surface 60b of the driver substrate 60 (see FIG. 4).

The coil pattern 63 includes an overlapping portion 63a, an adjacent portion 63b, and two loop-back portions 63c (see FIG. 4).

The overlapping portion 63a is formed in the first region A1 along a longitudinal direction of the target feed pattern 62a. The adjacent portion 63b is formed in the second region A2 along the longitudinal direction of the target feed pattern 62a.

The two loop-back portions 63c are each a portion connected to the overlapping portion 63a and the adjacent portion 63b. The two loop-back portions 63c are formed across the first region A1 and the second region A2.

The flow direction of the induction current is opposite in the overlapping portion 63a and the adjacent portion 63b. Similarly, the flow direction of the induction current is opposite in the two loop-back portions 63c.

As shown in FIG. 4, a first end 63x of the coil pattern 63 is positioned on an outer side of the coil pattern 63. A second end 63y of the coil pattern 63 is positioned on an inner side of the coil pattern 63.

The driver substrate 60 includes a first through-hole 65a and a second through-hole 65b that each penetrate through the driver substrate 60 (see FIG. 4 and FIG. 5).

The first through-hole 65a is formed on the inner side of the coil pattern 63 when seen along the thickness direction (see FIG. 4). The second through-hole 65b is formed on the outer side of the coil pattern 63 when seen along the thickness direction.

The detection circuit 64 further includes a first detection pattern 64a, a second detection pattern 64b, and a stretching pattern 64c that are each a wiring pattern (see FIG. 3 and FIG. 4).

The first detection pattern 64a and the second detection pattern 64b are formed on the outer side of the coil pattern 63 on the second surface 60b of the driver substrate 60.

The first detection pattern 64a is electrically connected to the current-voltage conversion circuit 641 and the first end 63x of the coil pattern 63. The second detection pattern 64b is electrically connected to the current-voltage conversion circuit 641.

The stretching pattern 64c is formed across the first surface 60a and second surface 60b of the driver substrate 60 via the first through-hole 65a and the second through-hole 65b. The stretching pattern 64c is electrically connected to the second detection pattern 64b and the second end 63y of the coil pattern 63.

In other words, the first end 63x of the coil pattern 63 is electrically connected to the current-voltage conversion circuit 641 via the first detection pattern 64a. The second end 63y of the coil pattern 63 is electrically connected to the current-voltage conversion circuit 641 via the stretching pattern 64c and the second detection pattern 64b.

By adopting the motor drive device 86, the circuit that detects the effective value of the motor current that flows in the stepping motor 3b is realized with a simple configuration.

The conveyance control portion 8b of the CPU 81 controls the driver circuit 61 according to the detection signal DS1. In the present embodiment, the conveyance control portion 8b constitutes a part of the motor drive device 86.

Specifically, the conveyance control portion 8b determines a frequency of the detection signal DS1. Further, when the detection signal DS1 satisfies a predetermined frequency condition, the conveyance control portion 8b changes a control mode of the driver circuit 61. The frequency condition is a condition that the frequency of the detection signal DS1 is within the audible band.

A situation where the frequency of the detection signal DS1 is within the audible band is a situation where the possibility of noises being generated in the stepping motor 3b or a peripheral portion of the stepping motor 3b is high.

In the present embodiment, when the detection signal DS1 satisfies the frequency condition, the conveyance control portion 8b changes a current decay mode of the driver circuit 61.

For example, when the detection signal DS1 satisfies the frequency condition under a situation where the motor current is controlled in a Slow-Decay mode, the conveyance control portion 8b changes the current decay mode to a Mix-Decay mode. Generally, when the motor current is controlled in the Slow-Decay mode, noises are apt to be generated in the stepping motor 3b or the like. It is noted that the conveyance control portion 8b may change the current decay mode from the Slow-Decay mode to a Fast-Decay mode depending on the sufficiency level of the frequency condition.

By changing the control mode of the driver circuit 61 when the detection signal DS1 satisfies the frequency condition, generation of noises in the stepping motor 3b or the like is suppressed.

Alternatively, the conveyance control portion 8b may change the current decay mode of the driver circuit 61 when the detection signal DS1 satisfies both the frequency condition and a predetermined reference level condition. The reference level condition is a condition that an amplitude or peak level of the detection signal DS1 exceeds a predetermined reference level.

When the detection signal DS1 does not satisfy the reference level condition, it is considered that large noises will not be generated in the stepping motor 3b or the like.

It is noted that when the detection signal DS1 satisfies a recovery condition under a situation where the motor current is controlled in the Mix-Decay mode or the Fast-Decay mode, the conveyance control portion 8b may set back the current decay mode to the Slow-Decay mode. For example, the recovery condition is a condition that the frequency of the detection signal DS1 continues for over a predetermined time within a standard band. The standard band is a band outside the audible band.

Further, when the detection signal DS1 satisfies a predetermined upper limit level condition, the conveyance control portion 8b may execute predetermined error processing. The upper limit level condition is a condition that the amplitude or peak level of the detection signal DS1 exceeds a predetermined upper limit level.

For example, the error processing includes processing of stopping supply of the motor current and processing of causing an error message to be displayed on the display device 802.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A motor drive device, comprising:
   a substrate;
   a motor drive portion which supplies a motor current to be supplied to a stepping motor to the substrate;
   a feed pattern which is a wiring pattern that is formed on a first surface of the substrate and through which the motor current flows;
   a coil pattern which is a wiring pattern that is formed in a spiral in a region along the feed pattern when seen along a thickness direction of the substrate on a second surface of the substrate, and includes an overlapping portion formed in a region overlapping with the feed pattern and an adjacent portion formed in a region adjacent to the feed pattern;
   a detection circuit which detects a magnitude of an induction current that flows in the coil pattern and outputs a detection signal; and
   a control portion which controls the motor drive portion according to the detection signal,
   wherein the detection circuit includes
   a current-voltage conversion circuit which converts the induction current that flows in the coil pattern into a primary detection voltage, and
   an amplifier circuit which amplifies the primary detection voltage and outputs a secondary detection voltage obtained by the amplification as the detection signal.

2. The motor drive device according to claim 1, further comprising:
   a first through-hole which penetrates through the substrate on an inner side of the coil pattern when seen along the thickness direction of the substrate; and
   a second through-hole which penetrates through the substrate on an outer side of the coil pattern when seen along the thickness direction of the substrate,
   wherein the detection circuit further includes
   a first detection pattern which is a wiring pattern that is electrically connected to the current-voltage conversion circuit and a first end of the coil pattern positioned on the outer side of the coil pattern and is formed on the outer side of the coil pattern on the second surface of the substrate,
   a second detection pattern which is a wiring pattern that is electrically connected to the current-voltage conversion circuit and is formed on the outer side of the coil pattern on the second surface of the substrate, and
   a stretching pattern which is a wiring pattern that is formed across the first surface and the second surface of the substrate via the first through-hole and the second through-hole and is electrically connected to the second detection pattern and a second end of the coil pattern positioned on the inner side of the coil pattern.

3. The motor drive device according to claim 1, wherein the control portion changes a current decay mode of the motor drive portion when a frequency of the detection signal is within a predetermined audible band.

4. An image forming apparatus, comprising:
   a conveying device which conveys a sheet; and
   a printing device which forms an image on the sheet conveyed by the conveying device,
   wherein the conveying device includes
   a conveying roller,
   a stepping motor which causes the conveying roller to rotate, and
   the motor drive device according to claim 1 which supplies a current to the stepping motor.

* * * * *